US012279001B2

(12) United States Patent
Pflueger et al.

(10) Patent No.: US 12,279,001 B2
(45) Date of Patent: Apr. 15, 2025

(54) METHOD FOR TRANSMITTING REAL TIME BASED DIGITAL VIDEO SIGNALS IN NETWORKS

(71) Applicant: Nanocosmos Informationstechnologien GmbH, Berlin (DE)

(72) Inventors: Ulrich Pflueger, Berlin (DE); Oliver Lietz, Berlin (DE)

(73) Assignee: Nanocosmos Informationstechnologien GmbH, Berlin (DE)

( * ) Notice: Subject to any disclaimer, the term of this patent is extended or adjusted under 35 U.S.C. 154(b) by 0 days.

(21) Appl. No.: 16/330,156

(22) PCT Filed: Sep. 4, 2017

(86) PCT No.: PCT/EP2017/072115
§ 371 (c)(1),
(2) Date: Mar. 4, 2019

(87) PCT Pub. No.: WO2018/042036
PCT Pub. Date: Mar. 8, 2018

(65) Prior Publication Data
US 2019/0191195 A1    Jun. 20, 2019

(30) Foreign Application Priority Data
Sep. 5, 2016 (DE) ............ 10 2016 116 555.7

(51) Int. Cl.
*H04N 21/236* (2011.01)
*H04N 21/2187* (2011.01)
(Continued)

(52) U.S. Cl.
CPC ... *H04N 21/23605* (2013.01); *H04N 21/2187* (2013.01); *H04N 21/2343* (2013.01);
(Continued)

(58) Field of Classification Search
CPC ......... H04N 21/8547; H04N 21/85406; H04N 21/8456; H04N 21/438; H04N 21/2343; H04N 21/2187; H04N 21/23605
See application file for complete search history.

(56) References Cited

U.S. PATENT DOCUMENTS

| 6,938,268 B1 * | 8/2005 | Hodge | H04N 21/6405 |
| | | | 348/E7.071 |
| 8,510,555 B2 * | 8/2013 | Tam | H04N 21/23473 |
| | | | 375/240.07 |

(Continued)

OTHER PUBLICATIONS

International Preliminary Report on Patentability and Written Opinion, issued Mar. 5, 2019 in International Patent Application No. PCT/EP2017/072115.

(Continued)

*Primary Examiner* — Mushfikh I Alam
(74) *Attorney, Agent, or Firm* — Wood, Phillips, Katz, Clark & Mortimer

(57) ABSTRACT

A method for the transmission of video signals from a video signal source to a playback device is proposed. The signal is output in a stream from the video signal source and subsequently fragmented according to a known format into packets, the size of which corresponds at least to one video frame with associated audio information. The packets are transmitted to the playback device with the aid of which the contents of the packets is displayed.

21 Claims, 4 Drawing Sheets

(51) Int. Cl.
*H04N 21/2343* (2011.01)
*H04N 21/438* (2011.01)
*H04N 21/845* (2011.01)
*H04N 21/854* (2011.01)
*H04N 21/8547* (2011.01)

(52) U.S. Cl.
CPC ....... *H04N 21/438* (2013.01); *H04N 21/8456* (2013.01); *H04N 21/85406* (2013.01); *H04N 21/8547* (2013.01)

(56) References Cited

U.S. PATENT DOCUMENTS

| | | | | | |
|---|---|---|---|---|---|
| 8,601,506 | B2 * | 12/2013 | Harwell | ............... | H04N 21/2343 |
| | | | | | 725/116 |
| 8,955,027 | B1 * | 2/2015 | Dong | ............... | H04N 21/23424 |
| | | | | | 725/116 |
| 9,032,466 | B2 * | 5/2015 | Gupta | ................. | H04N 21/443 |
| | | | | | 725/114 |
| 9,700,790 | B2 * | 7/2017 | Perlman | ................. | H04L 65/765 |
| 2002/0053053 | A1 * | 5/2002 | Nagai | .................... | H04L 1/205 |
| | | | | | 375/E7.016 |
| 2003/0058707 | A1 * | 3/2003 | Dilger | ................. | H04N 21/8543 |
| | | | | | 348/E7.06 |
| 2008/0133766 | A1 * | 6/2008 | Luo | ....................... | H04W 72/52 |
| | | | | | 709/227 |
| 2011/0080940 | A1 | 4/2011 | Bocharov et al. | | |
| 2011/0282965 | A1 * | 11/2011 | Dodson | ................ | H04N 21/812 |
| | | | | | 709/217 |
| 2012/0011270 | A1 * | 1/2012 | Priddle | ................. | H04L 65/605 |
| | | | | | 709/231 |
| 2012/0166289 | A1 * | 6/2012 | Gadoury | ................ | H04L 65/611 |
| | | | | | 709/219 |
| 2012/0207215 | A1 * | 8/2012 | Ryu | ..................... | H04N 21/242 |
| | | | | | 375/E7.243 |
| 2013/0007223 | A1 * | 1/2013 | Luby | .............. | H04N 21/234327 |
| | | | | | 709/219 |
| 2013/0080579 | A1 * | 3/2013 | Gordon | .............. | H04N 21/2408 |
| | | | | | 709/217 |
| 2013/0132507 | A1 | 5/2013 | Swaminathan et al. | | |
| 2013/0205326 | A1 * | 8/2013 | Sinha | ............... | H04N 21/44008 |
| | | | | | 725/23 |
| 2014/0198839 | A1 * | 7/2014 | Potdar | ................ | H04N 21/8547 |
| | | | | | 375/240.02 |
| 2014/0237512 | A1 * | 8/2014 | Perlman | .................... | H04N 9/87 |
| | | | | | 725/100 |
| 2014/0380352 | A1 * | 12/2014 | Mangalore | ......... | H04N 21/4181 |
| | | | | | 725/31 |
| 2015/0141145 | A1 * | 5/2015 | Perlman | ............... | H04N 19/166 |
| | | | | | 463/31 |
| 2015/0264096 | A1 * | 9/2015 | Swaminathan | ....... | H04L 65/612 |
| | | | | | 709/219 |
| 2016/0100211 | A1 * | 4/2016 | Toma | ................. | H04N 21/4307 |
| | | | | | 725/116 |
| 2016/0191961 | A1 * | 6/2016 | Fisher | ............ | H04N 21/6125 |
| | | | | | 725/116 |
| 2017/0055041 | A1 * | 2/2017 | Zhu | ..................... | H04N 21/6125 |
| 2018/0063213 | A1 * | 3/2018 | Bevilacqua-Linn | ......................... | H04N 21/2387 |

OTHER PUBLICATIONS

International Search Report mailed Nov. 28, 2017 in International Patent Application No. PCT?EP2017/072115.

* cited by examiner

METHOD FOR TRANSMITTING REAL TIME BASED DIGITAL VIDEO SIGNALS IN NETWORKS

The method relates to the transmission of digital video and audio signals from a video signal source via a server to a playback device, at which the data provided by the video signal source are depicted.

STATE OF THE ART

The transmission of real time video data, also called live streaming, in networks generally involves a number of intermediate stations, starting with a camera, going forward through a processing or encoding unit which usually is in the camera or connected to it, with data sent to a server, which performs the forwarding to the receiver/the playback device. The transmission paths and units in the networks can lead to delays in the transmission. Additional delays result from media-technically necessary interventions and processing units, which are required on the basis of current standards and technologies. All delays in the network add up to a delay total.

The transmission of video data of highest possible quality is a highly technical challenge bringing with it a number of different problems, which lead to restrictions in picture quality as well as to a delay in playback frequently spanning a range of several seconds.

The quality of transmission is the result, on the one hand, of the picture quality itself, but also of the continuity of playback. Picture quality is related to the available bandwidth in the network, and continuity is related to the frame rate, which is measured in frames per second or Hz. Up to now present methods have not been able to make it possible to transmit video data without loss of quality in all available networks. Video data must be compressed (encoded), in order not to exceed the available bandwidth in the network. In order to adapt the data quantity of the produced video signal to the available bandwidth, loss-promoting compression methods are required, which should only permit a minimum of visible errors. Processing and compressing of video and audio data as a rule takes place independently of each other in separate modules.

When compressing video data hybrid methods are used, which generate a widely fluctuating data quantity per frame due to the use of different frame types (key frames=I-Frames, different frames=P/B frames). The combination of image groups matching the distance between key frames is called "group of pictures" (GOP). The GOP length frequently lies within a range of 1-10 seconds or more. The longer the GOP length, the better is the average video quality achieved, but the length of the necessary image buffers also increases.

In order to be able to compensate for fluctuations in the data rate of the encoder as well as in the available network bandwidth, buffer memories are used, which are to compensate for fluctuations over certain periods of time. In addition, during compression long key frame (I-frame) distances are chosen, which also lie in the range of 2-10 seconds. Multiple buffering in all participating components (transmitters, servers, receivers) frequently results in buffer times/latencies of more than 30 seconds.

A substantially lower latency is required for a video communication between different subscribers, in particular if the signals concerned are signals which shall come close to "real time" (e.g. video conference, live events).

A method for generating a file format for multimedia streaming is already known, and also known is a device for multimedia streaming using this format. This involves generating fragments of data. In each fragment a plurality of multimedia data boxes are sequentially arranged, and to terminate a fragment a box is arranged, which contains metadata relating to the multimedia data. (US 2011/0276662 A1).

Packeting/Multiplex

The signal output in a stream from the video signal source is divided into packets. A packet can contain video data, audio data or both (multiplex).

The term packet in this context relates to summarizing, multiplexing of video data and, as required, audio data in output format, it does not relate to the size of packets during network transport, which is subsequently performed at a lower system level. Discussing the network layer is not a subject of this invention.

The term streaming, when used in the context of video communication, is normally distinguished by the number of viewers. Streaming shall be possible irrespective of the number of viewers.

With video-on-demand streaming, in which certain existing pre-recorded video data are retrieved, the problem of the above mentioned latencies is unimportant in contrast to real time live streaming, which is the subject of this invention.

In real time live streaming the material is not produced in advance, but generated in real time in the present. The sources generally are live cameras, either separate devices or devices fitted into a device (mobile device, laptop, surveillance camera, action cam, stationary or mounted onto mobile devices, etc.). But the source may also be an artificially generated signal not necessarily coming from a camera, e.g. for presentations or games.

Protocols and Standards for streaming already exist.

RTMP (Real Time Messaging Protocol): this method was invented by the company "Adobe" as part of the "Flash" technology and is not officially standardized and meanwhile out of date. It is based on a continuous data stream, which can be sent by a server to a client (player). Current playback devices need an additional software module ("Flash plugin") in order to be able to use RTMP. The Flash plugin was, for many years, part of browser applications on the desktop but will, as from presumably 2017, no longer be supported by any browser. This technology is not supported by mobile devices, most TVs and embedded devices such as IoT.

http Live Streaming (HLS and DASH)

HLS was invented by Apple and is based on a buffered transmission of sections of live streams. DASH is an ISO standard and is based on the same principle. The sections of live stream must be of a certain minimum size in order to ensure an error-free transmission.

Streaming/Playback with HTML5

HLS and DASH are part of the "HTML5" standard, which is supported by most browser manufacturers.

Using HTML5 it is possible to embed video data directly on a website and thus to present them in multimedia environments. HTML allows only certain video formats and protocols for the embedding of video data.

With HTML5 the state of the art are the following video compression methods: ISO-MPEG4, ITU-H264 with the MP4 file format as well as the proprietary VP8 or VP9 with the WebM file format. The file-based formats such as mp4 are in principle not designed for real time playback.

As regards transmission and playback via real time (live) signals over networks there exist in addition the HLS protocol (proprietary Apple for iPhone and MacOS based on the MPEG-TS format) as well as the MPEG DASH protocol. However in these cases "live" does not mean real time, but delays of frequently 30 seconds and more. This can be reduced by fine tuning of all state of the art components to the minimum range of 6-10 seconds.

Up to now the transmission of video signals with short latencies required methods other than the above-mentioned HTML/HTTP protocols. State of the art in this case are the UDP and RTP protocols, which are for example used in Skype applications or in WebRTC web technology.

Real time communication in contrast to streaming is not standardized in the form of international standards and available only on a few devices, so that terminals such as TV and mobile devices do not have an interface suitable for this.

The transmission with short latency periods with these protocols does frequently not lead to an interruption-free transmission, which limits the application experience.

Video communication applications are designed for the transmission of point-to-point connections similar to (one-to-one) telephony.

The protocols for video communication and chat (Skype, WebRTC) are not compatible with streaming standards (HTML5, HLS, DASH).

The main shortcoming of previous HTML/http solutions is the long delay in image transmission over several seconds. The big disadvantage here consists in that these methods are not suitable for communication applications requiring a short latency period between transmitter and receiver (for example for audio/video telephony or interactive inclusion of viewers with a feedback channel). Application areas such as video conferences or auctions are therefore not possible.

In the state of the art an HTML 5-video element is capable of playing back either a complete file or a video fragment or segment, which can be provided in the form of a file or as part of a data stream. Segments are used for the DASH and HLS formats, which in turn are divided into fragments. The ISO MP4 file format is state of the art in the fMP4 variant. Here a segment length corresponds to at least the GOP length, i.e. 1 to 10 seconds per segment. The additionally inserted latency is the length of one segment. According to the state of the art a segment may contain one or more complete GOPs. The minimal latency thus corresponds to the GOP length. In existing facilities a three-fold latency is generated by means of multiple buffering.

Fragmentation may be performed e.g. on the basis of the fMP4 ISO standard.

For the fMP4 format "packet" is synonymous with MP4 fragment. The temporal size of a fragment corresponds to several video frames in the state of the art. According to the state of the art a fragment contains at least the number of video frames of one GOP length.

The fragments consist of different type names ("atoms"). The packet fragments are divided into headers and useful data (payload). There exists therefore a space between individual useful data of the packet fragments, which solely consists of header information for the "moof" and "mdat" "atoms", which can be used for synchronization.

Transmission is normally carried out via the TCP IP protocol, so that an interference along the transmission section at this protocol level is not possible. In case the connection is interrupted, it is necessary and possible, to revert to live streaming in order to continue with real time transmission.

Buffer memories exist both in encoding and on the server and in the playback device.

It may be provided that each packet is given a time stamp. Time stamps are a common means for the synchronization of A/V packets. For each point in time of recording a live source there is a time stamp, which can be synchronized with real time. On the playback side it can then be determined, how late or early the packet reacts in comparison to real time and to other packets.

A data stream corresponding to the fMP4 format consists of an introductory "ftyp" and "moov" data structure followed by for example 5 packet fragments.

Each packet fragment consists of 2 parts, that is a "moof" part, which consists of information on the number of video and audio frames in the packet, on the temporal position or duration of the video and audio frames, on the byte size of the video and audio frames as well as on the byte position of the video and audio frames. This "moof" atom is then joined to a "mdat" atom, which contains the actual video and audio data. The individual parts of this stream illustrated by way of example are directly joined to each other.

Instead of the fMP4 format the HLS format can be used for segmentation and fragmentation. The HLS format consists of two parts: several segments in the format TS (ISO-MPEG-transport stream), each of which comprises at least one GOP length and can be played back independently of one another, and the index data (playlist) in the format m3u8, each of which points to the segments. Usually 3 segments per index are used, which shift during transmission in terms of time. Ten seconds per segment for example result in a minimum latency of 3×10=30 seconds.

The playback device of the state of the art contains its own buffer, which generates an additional latency. The buffer is automatically set in the playback device. As a rule this occurs on the basis of the set play duration of the data stream, which at least corresponds to the segment length.

The data generated by the signal source is not always generated continually in practice due to time fluctuations of the systems and other system influences. Example: theoretically a camera has a frame rate of 25 frames per second. One frame corresponds to a time duration of 40 ms. The frames generated by the signal source can in practice follow each other in different time intervals. In the example a gap of 3 frames could be created, which corresponds to 3×40=120 ms time duration. 5 frames per second would e.g. result in 200 ms per frame and 3 frames would result in 600 ms. In the state of the art these gaps lead to latencies on the playback side.

DESCRIPTION OF THE INVENTION

The invention is based on the objective to propose a method for the transmission of real-time-based digital video signals in networks, which can be used even in cases, where a quick reaction on the part of the receiver is critical, for example at video conferences, auctions or interactive involvement of the audience.

To meet this objective the invention proposes a method with the characteristics cited in claim 1. Further developments of the invention are the subject of sub-claims.

The signal output in a stream by the video signal source is therefore fragmented into packets, wherein one packet fragment corresponds to at least one video frame with associated audio information. The use of exactly one video frame permits playback with the shortest possible delay between video recording and the playback. When using a number of video frames in a packet fragment, the delay is still distinctly less than in the state of the art, as long as the number of video frames contained in the packet fragment remains below the number in one GOP (Group of Pictures) as known from the state of the art.

The temporal size of a fragment corresponds to the length of one or more video frames, which is less than one GOP. The data size corresponds to that of one or more video frames and, as required, to the temporally corresponding audio data plus multiplex data.

There may be buffer memories in the processing unit and the playback device, wherein however, according to the invention the packeting unit keeps the buffer as small as possible, since filling a buffer is normally linked to latencies, which the invention wants to keep as short as possible.

In a further development of the invention it may be provided that the packeting into fragments is performed in the area of the video source.

It has however been found to be particularly meaningful, if the packeting into fragments is performed with the aid of a server which is separate from the video source.

But it is also possible in individual cases and falls within the scope of the invention if packet fragmenting takes place in the playback device, for example in the browser. Here intervention may take place at script level, i.e. with the aid of a program module supported by the browser. This is normally Javascript. This kind of program control with Javascript is commonly used for a plurality of applications and is state of the art, This program control takes place in environments controlled by the browser.

As a further development of the invention it may be provided that the packet fragments are present in the fragmented MP4 format (fMP4). According to this format an initialization segment is provided, to which is joined a repeating group consisting of a fragment header (moof) and a fragment data segment (mdat).

Further features, details and advantages are revealed in the description hereunder of a preferred exemplary embodiment and in the drawing, in which.

Figure 1:
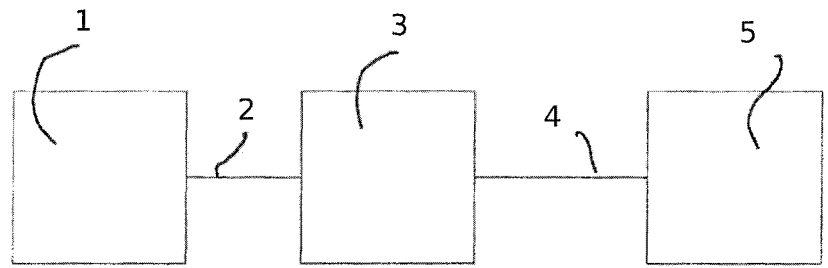
FIG. 1 shows a schematic summary of the different stages of the invention.

FIG. 1 schematically shows, vastly simplified, the structure of a transmission system, in which the method proposed by the invention is used. The video signal is generated by a video signal source 1, for example a video camera. The video signal source 1 is connected to a packeting device 3 via a transmission path 2. The packeting device 3 may for example be a server. The signal of the video source 1 is transmitted to the packeting device via the transmission path 2. In the packeting device 3 the video signal is fragmented into packets, which will be further explained in detail hereunder. The packeting device 3 is connected via a further transmission path/a channel 4 to a playback device 5, on which a user can see, what the source is sending and transmitting.

The channel 4 may be a continuous channel for sending and returning data. But it may also be a static channel, which only works in the direction from the server 3 to the playback device 5, without there being a return channel.

Adaptations of the incoming data stream are performed in the packeting device 3, i.e. on the one hand this means packeting and segmenting of the incoming data stream and on the other, adaptation of the data stream to a format compatible with the payback device 3.

Figure 2:
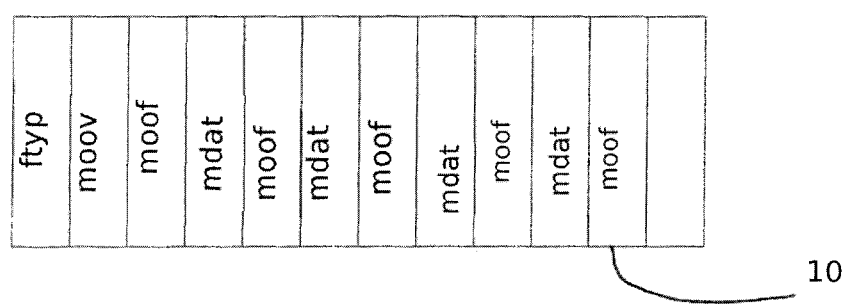
FIG. 2 shows a schematic depiction of a stream consisting of 5 fragments.

FIG. 2, by way of example, shows the data stream in an fMP4 format (the fMP4 format itself is state of the art). This means that the stream is in a standard compatible form. The stream begins with an ftyp box, followed by a moov box. This is then followed by a continuous sequence of alternating moof metadata boxes and mdat media data boxes.

Each fragment consists of a moof box and a mdat box. Moof contains information on the number of video and audio frames in the packet, on the temporal position or duration of the video and audio frame, on the byte size of the video and audio frames and on the byte position of the video and audio frames. The video and audio data as such are contained in the mdat box.

Since a continuous stream is transmitted, only one request is required.

Figure 3:
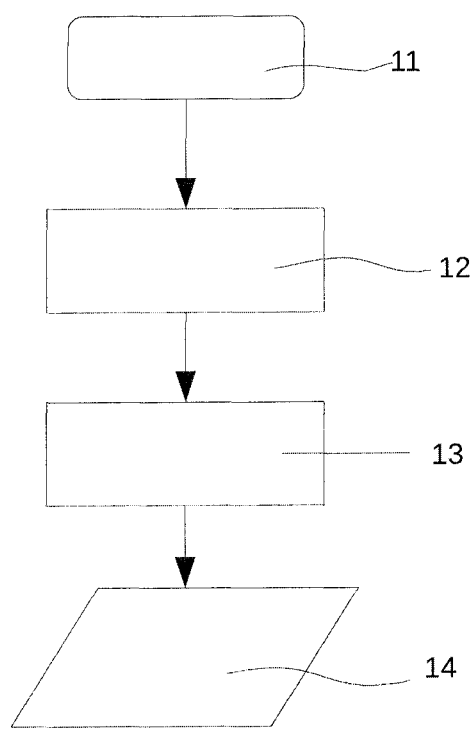
FIG. 3 shows a flow diagram of a processing unit for processing the incoming stream.

FIG. 3 shows, in simplified form, the procedure/sequence of the method within a processing unit, in which the input stream is processed. The method begins with block 11, in which the stream arrives. Block 11 is followed by the processing block 12, also called demultiplexing block. This is the block in which the arriving stream is split into video, audio and metadata packets.

In the next block 13 the data is converted into the internal packet structure of the media data. These media data include the packet type, i.e. video, audio or metadata, time information, a synchronizing point, video and audio configuration data, data buffer and data size.

Figure 4:
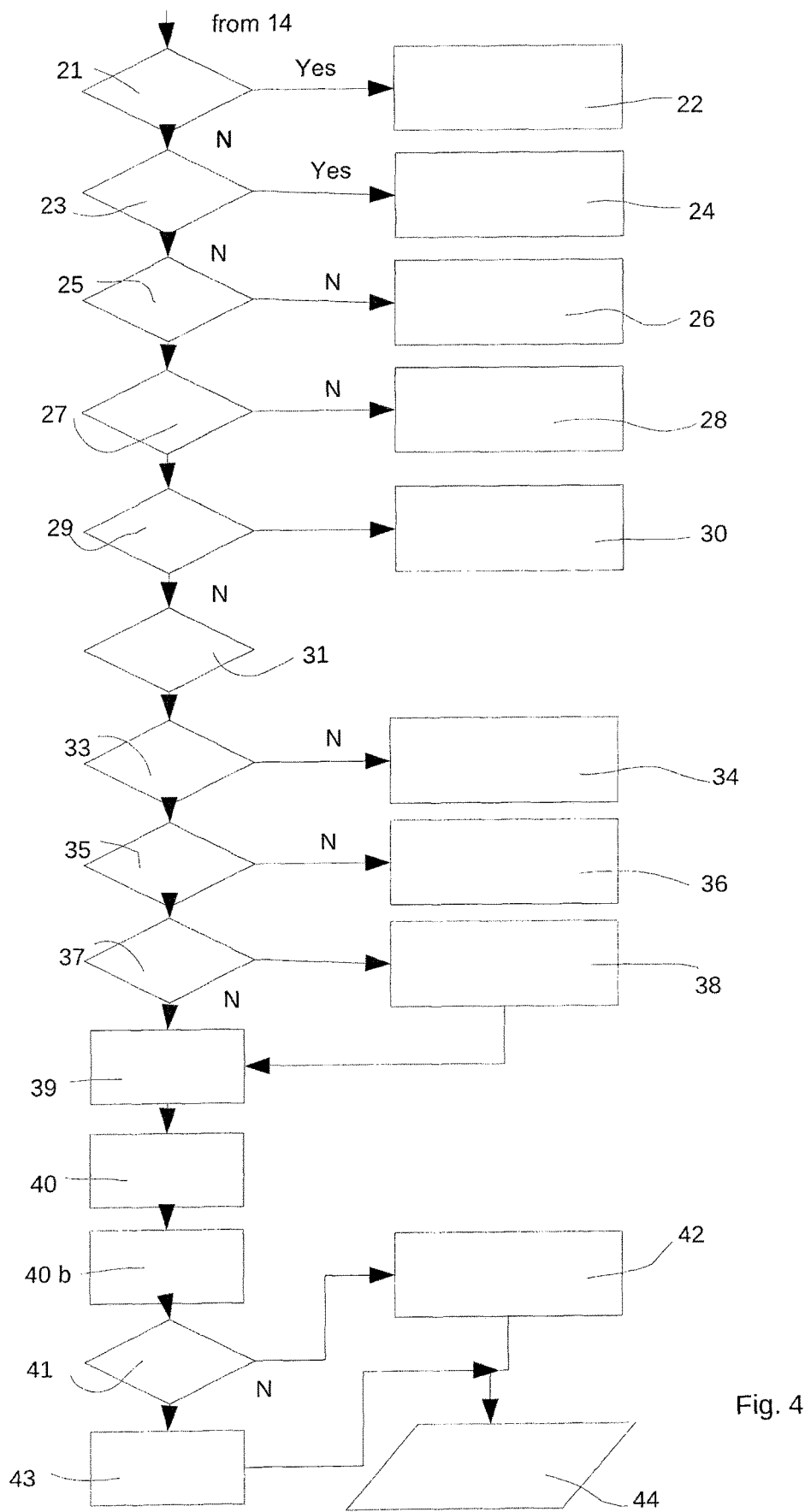
FIG. 4 shows a flow diagram of the processing of the packeting unit mentioned in FIG. 1.

In the next block 14 output takes place to the device, which performs the packeting according to the invention, and this device is explained in detail in FIG. 4.

From block 14 the data goes to the query block 21 of FIG. 4. Here the incoming data are queried as to whether they are configuration data. If they are indeed configuration data, the data are stored in block 22.

If it is not configuration data the process continues at block 23, where it is queried as to whether it is metadata. If the answer is yes, these are stored in block 24. If the answer is no, the process continues with block 25, where it is queried, as to whether the stored configuration data are available. In case the configuration data have not been stored as a result of the query in block 25, the data packet is discarded in block 26.

If the query is positive, it is checked in block 27, as to whether a key frame is contained in this packet or a key frame has already been received. If no, the data packet is discarded in block 28.

If the query is positive it is queried in the next block 29, as to whether this is an audio packet. If yes, the audio packet is stored in block 30.

In the next block 31 it is queried, as to whether this is a video packet. If yes, it is queried in the next block 33, as to whether this is the start of a video frame. If this is not the case, the video packet is stored in block 34.

If the query is positive it is checked in the next query block 35, as to whether the number of video frames in the fragment is buffered. If not, the video packet is stored in block 36.

If the fragment is the first fragment to be sent, which has been determined in block 37, then initialization of an ftyp and moov header is prepared and performed in block 38, see details referring to FIG. 2.

Subsequently, even if the answer to the query in query block 37 was negative, the moof header of a fragment is prepared and created in block 39. Thereupon the data part of the fragment is created in block 40, i.e. the mdat element, which was explained in FIG. 2.

The current video packet is stored in block 40*b*.

If the fragment is the first fragment to be transmitted, which has been determined in query block 41, the initializing header, the fragment header and the fragment data are output in block 42.

If the fragment is not the first fragment to be transmitted, i.e. if the answer in query block 41 was negative, the fragment header and the fragment data are output in block 43. The output in block 44 signifies the end of the activity of the packeting unit.

Figure 5:
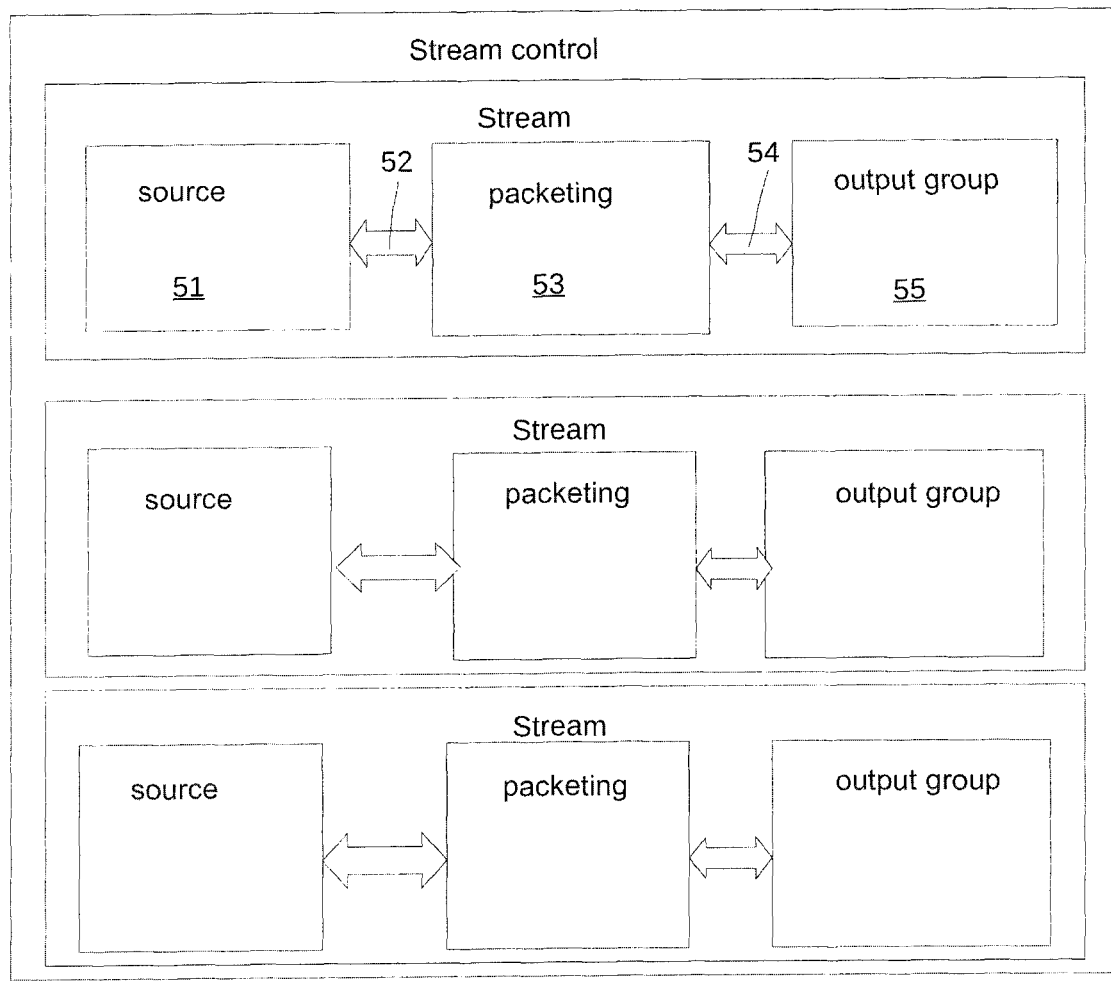
FIG. 5 shows a higher-level diagram.

FIG. 5, in a higher-level depiction, shows once more the structure of the method as proposed by the invention. The stream is controlled such that "source" is the beginning, where the data stream is provided. The video, audio and metadata contained in the stream are unpacked and forwarded via the connection 52 to the packeting/multiplexing component 53. The multiplexing component 53 carries out, what has been explained in detail in FIG. 4. In this multiplexing component 53 an HTML5-capable file stream format is generated. This may, for example based on software available today, be fMP4 for Chrome, Firebox or IE11. As regards Safari macOSX and iOS, preference is for the m3u8/ts(HLS) format. Subsequently forwarding is performed via the connection 54 to the output group 55. From here, forwarding is performed to the outputs which have no longer been illustrated in detail.

The end-to-end latency total is the sum of the network transport latency, the format-related latencies and the latency caused by buffering in the playback device.

The network transport latencies are composed of the communication from the encoder to the server, the forwarding from the server to packeting unit Player/Transmux server (53 in FIG. 50) and the forwarding from here to the playback device.

Time-related dependencies caused by groupings during delivery of a stream lead to an additional latency. The beginning of a segment or fragment cannot be delivered until all samples contained in it have been received. The additional latency with fMP4 formatting is the length of an fMP4 fragment. With the methods used up to now one fragment contains one or more complete GOPs (group of pictures, image group). The minimum latency with known methods thus corresponds to the GOP length. As a result of the method proposed by the invention of fragmenting each frame, the format-related latency is shortened to the frame length.

Segmenting and fragmenting can also be done using the HLS format instead of fMP4. In the state of the art, when using the HLS format the format-related additional latency is length times number of HLS segments, for example 3*3 seconds=9 seconds. Due to the measures according to the invention, the HLS playlist contains only one segment with a short nominal play duration (m3u8 tags).

The buffer in the playback device according to the state of the art corresponds to at least one segment length, which can also lead to a latency.

In a further development of the invention it may be provided to set the nominal play duration of the segments to low values. This may be controlled through adaptation by the device in the fMP4 header and/or in the HLS playlist.

The device continues to monitor and control the buffer in the playback unit.

In the state of the art a segment or fragment corresponding to a GOP is transmitted on demand to the player, who regards this segment as a segment to be played back on its own. Following playback of the segment the player requests a new segment. This method has technical limits as regards the minimum length of the GOP and the access and request times between the units.

According to the invention the GOP limit is lifted. Many small frames are transmitted and received as a data stream.

In a further development of the invention it may be provided that time information (time stamp, time duration, play times) is changed.

In a further development of the invention it may be provided that audio packets are transmitted jointly with, or separately from, video packets.

In a further development of the invention it may be provided that packets are omitted or added.

The invention claimed is:

1. A method for the transmission of video signals from a video signal source to a playback device, comprising the following method steps:
   the signal is output from a video signal source in a stream,
   the stream existing as a signal is fragmented into packets according to a known format,
   wherein the packet size corresponds to at least one video frame with associated audio information and the total number of video frames contained in the packet is less than the number of video frames in one Group of Pictures,
   the packets are transmitted without a temporal distance to the playback device,
   the contents of the packets is displayed with the aid of the playback device,
   wherein the packets are transmitted as a continuous stream, which requires only one request, and
   wherein the method is a method for the transmission of real-time-based digital video signals during an interactive involvement of the receiving audience in networks.

2. The method according to claim 1, in which fragmentation of the packets is performed at the video source.

3. The method according to claim 1, in which fragmentation of the packets is performed with the aid of a server separate from the video source.

4. The method according to claim 1, in which fragmentation of the packets is performed in the playback device.

5. The method according to claim 1, in which each packet is provided with a time stamp.

6. The method according to claim 1, in which, in case the stream coming from the signal source is sent in a format incompatible with the playback device, this is converted by a packeting unit into a format supported by the playback device.

7. The method according to claim 1, in which the time stamps of the incoming real time data are adapted to the dimensions required for a correct playback.

8. The method according to claim 1, in which fragmentation is independent of key frames and GOP length.

9. The method according to claim 1, in which fragmentation of the packets is present in the fragmented MP4 format.

10. The method according to claim 1, in which fragmentation of the packets is present in the HLS format.

11. The method according to claim 1, in which time information is changed.

12. The method according to claim 1, in which audio packets are transmitted jointly with, or separate from, video packets.

13. The method according to claim 1, in which packets are omitted or added.

14. The method according to claim 1, wherein the video signal is real-time based digital video signal.

15. The method according to claim 1, wherein the video signal source is a video signal source for real time live streaming of the video signal.

16. The method according to claim 15, wherein the video signal source is a video camera or that the video signal source is adapted to output an artificially generated video signal.

17. The method according to claim 1, wherein the method is a method for video communication between different subscribers.

18. The method according to claim 1, wherein the method uses HTML for the transmission of real time video signals.

19. The method according to claim 1, wherein the temporal size of a packet corresponds to the length of one or more video frames, which is less than one GOP.

20. The method according to claim 1, wherein the fragmentation is performed according to the fMP4 ISO standard.

21. A method for the transmission of real-time-based video signals from a video signal source to a playback device, comprising:

the playback device generating one request for a video signal;

responsive to the one request, a real-time video signal source outputs a video in a stream;

the stream existing as a signal is fragmented into packets according to a known format, wherein the packet size corresponds to at least one video frame with associated audio information and the total number of video frames contained in the packet is less than the number of video frames in one Group of Pictures;

transmitting the packets as a continuous stream without a temporal distance responsive to the one request; and displaying the contents of the packets with the aid of the playback device, wherein the method is a method for the transmission of real-time-based video signals during an interactive involvement of a receiving audience in networks.

\* \* \* \* \*